United States Patent [19]

Spykerman

[11] Patent Number: 5,547,187

[45] Date of Patent: Aug. 20, 1996

[54] MULTI-FUNCTION COVER

[75] Inventor: David J. Spykerman, Zeeland, Mich.

[73] Assignee: Prince Corporation, Holland, Mich.

[21] Appl. No.: 295,267

[22] Filed: Aug. 24, 1994

[51] Int. Cl.⁶ .................................................. B60R 7/04
[52] U.S. Cl. ..................................... 296/37.16; 296/39.1
[58] Field of Search .................... 296/37.16, 37.8, 296/37.13, 37.15, 37.5, 37.1, 39.1

[56] References Cited

U.S. PATENT DOCUMENTS

| | | | |
|---|---|---|---|
| Re. 26,299 | 11/1967 | Burns | 296/37.16 X |
| 1,527,056 | 2/1925 | Martin | 296/37.15 X |
| 2,384,285 | 9/1945 | Deutsch | 2/17 |
| 3,088,771 | 5/1963 | Weigle | 296/37.5 X |
| 4,277,097 | 7/1981 | Lalanne | 296/37.16 |
| 5,009,458 | 4/1991 | Shute | 296/37.13 |
| 5,207,260 | 5/1993 | Commesso | 296/37.16 X |
| 5,213,387 | 5/1993 | Decker et al. | 296/37.16 |
| 5,340,183 | 8/1994 | Horian | 296/37.5 X |

*Primary Examiner*—Joseph D. Pape
*Attorney, Agent, or Firm*—Price, Heneveld, Cooper, DeWitt & Litton

[57] ABSTRACT

A cover made of a web of flexible material has one edge anchored to a vehicle and an opposite free edge movable across the vehicle to a position remote from the anchored edge. Brackets are provided for mounting at opposite sides of the vehicle for holding the cover in a security position or in a stored position defining a carrying pouch. The cover can rest on the floor of the vehicle for providing a protective liner for the vehicles carpeting. In a preferred embodiment of the invention, the free edge of the cover includes a rigid cross-bar with a spring loaded handle for providing biasing tension holding the cover in an extended security position.

32 Claims, 3 Drawing Sheets

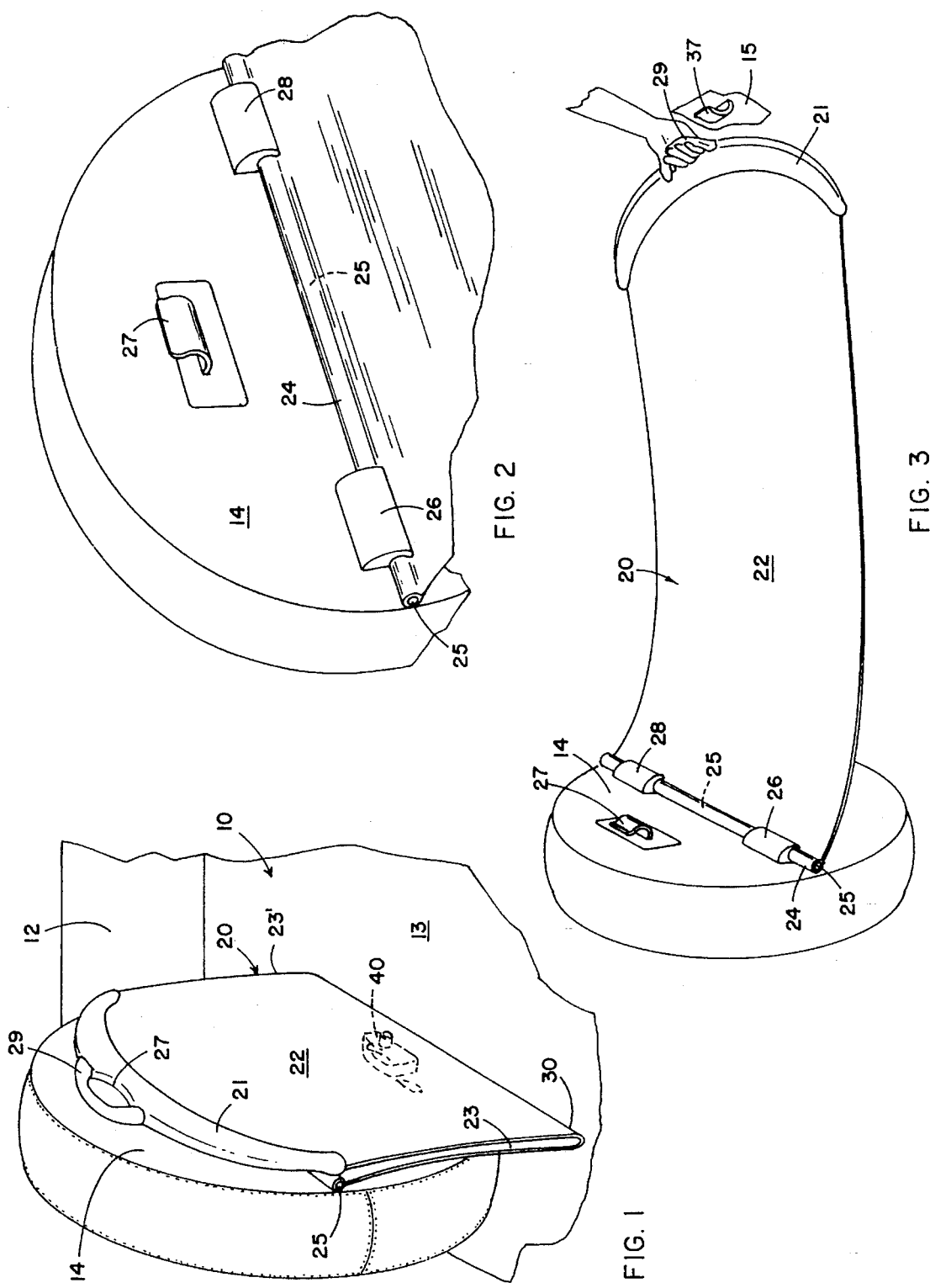

MULTI-FUNCTION COVER

BACKGROUND OF THE INVENTION

The present invention relates to a cover and storage system for a vehicle.

Many sports-utility vehicles include hatch-back type rear entrance doors which permit ease of access for loading and unloading items to be transported. Frequently vehicles such as station wagons and vans include a roller-shade type security cover which extends from the back of the rear seat rearwardly and hooks over retainers for covering items on the floor of the storage area for security purposes. U.S. Pat. No. 4,227,097 discloses such a system as well as a roller-type cover which extends transversely from one side to the other across the storage area of a hatch-back type vehicle.

Although such covers provide security for items stored underneath the covers, they operate only between a fully extended and locked position and a retracted rolled-up position with no other utilitarian functions. Thus, there remains a need for a security cover which can, in addition to providing a cover for items stored below in a station wagon or other utility type vehicle, provide other functions as well.

SUMMARY OF THE PRESENT INVENTION

The multi-function cover of the present invention satisfies this need by providing a folding cover which can be anchored at one edge to either the side or rear seat of a vehicle. An opposite free edge can be folded in half and removably held adjacent the anchored edge for storage. In this position, the cover defines a storage pouch for carrying items. The free edge of the web can be removed and extended across the vehicle and hooked to a suitable bracket for providing a security cover extending over objects to be transported. In addition, the cover so formed can be laid on the floor of the vehicle for providing a protective cover for hauling items which may otherwise soil or damage the vehicle's carpeting.

Thus, the system of the present invention provides a cover made of a web of flexible material having one edge anchored to the vehicle and an opposite free edge movable across the vehicle to a position remote from the anchored edge. Brackets are provided for mounting at opposite sides of the vehicle for holding the cover in a security position or in a stored position defining a carrying pouch. The cover can rest on the floor of the vehicle for providing a protective liner for the vehicles carpeting. In a preferred embodiment of the invention, the free edge of the cover includes a rigid cross-bar with a spring loaded handle for providing biasing tension holding the cover in an extended security position. The various features, objects and advantages of the present invention will become apparent upon reading the following description together with reference to the accompanying drawings in which:

BRIEF DESCRIPTION OF THE DRAWINGS

FIG. 1 is a fragmentary perspective view of the rear storage area of a vehicle including the multi-function cover of the present invention shown in a stored position defining a storage pouch;

FIG. 2 is an enlarged fragmentary perspective view of the mounting brackets for the anchored end of the cover shown in FIG. 1;

FIG. 3 is a perspective view of the cover shown in FIG. 1 shown in an extended position defining a security cover;

DETAILED DESCRIPTION OF THE PREFERRED EMBODIMENT

Figure 5:
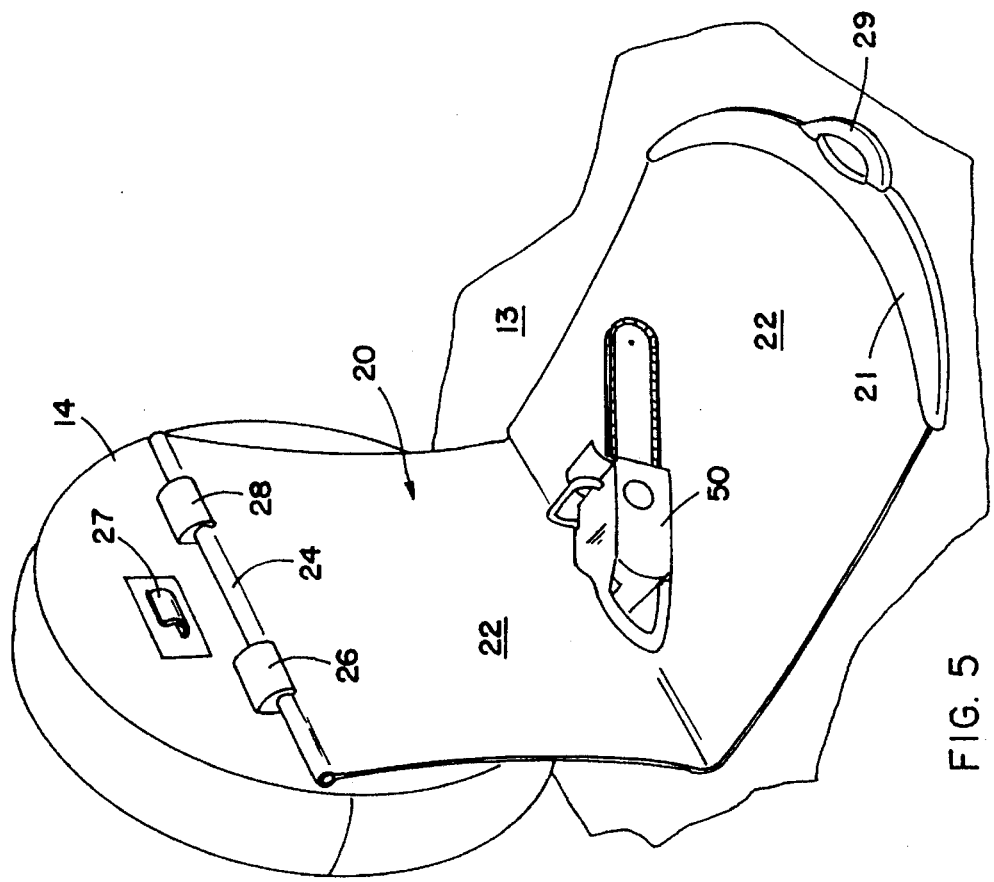
FIG. 5 is a fragmentary perspective view of the cover shown in another use position providing protection for the floor area of the vehicle.

Referring initially to FIGS. 1 and 2 there is shown the rear storage area 10 of a utility vehicle such as a station wagon, van, or sports-utility vehicle which includes a rear seat 12 and may include a spare tire storage housing 14 along the side wall of the vehicle inside the storage area. The vehicle includes a cover 20 embodying the present invention which comprises an elongated generally rectangular web 22 of flexible fabric which can be a heavy duty vinyl material, a close-knit woven Nylon material or other suitable material which is stain resistant, water impermeable, and opaque to provide a function of a security cover, a storage pouch, and a protective cover as shown in FIGS. 3,1, and 5 respectively.

Cover 20 includes a first edge 24 which is fixedly anchored to the vehicle as seen in FIG. 2 by means of a pair of first brackets 26 and 28 which are mounted on the spare tire housing 14 in the embodiment shown but could be mounted to the back of the rear seat 12 or directly to the sidewall of the vehicle in other embodiments. The end 24 of web 22 extends around a rigid support comprising a cylindrical rod 25 and is suitably secured to the rod by stitching or by the use of an adhesive or by welding. Rod 25 thereby provides the function of spreading and holding the anchored edge 24 of the cover in position with the full width of the generally rectangular cover extended by the reinforcing rod 25. The opposite edge of the web 22 may include a similar reinforcing rod although in a preferred embodiment a generally C-shaped decorative rigid support 21 is provided and has a spring loaded handle 29 at its apex which fits over a storage hook 27 mounted between and above brackets 26 and 28 (FIG. 2) for receiving handle 29 as seen in FIG. 1. In this position, the web 22 forms a storage pouch into which items such as a camera 40 or other valuables can be stored and concealed from view.

Web 22 includes an open forward edge 23 and an open rear edge 23' which allows items such as a camera 40 to be easily inserted and removed from the pouch so formed. The length of the web 22 is selected to extend across the width of the vehicle to serve as a security cover and is mounted to the housing 14 such that the floor (i.e. fold line 30) of the pouch preferably rests against the floor of the vehicle when in a stored position as seen in FIG. 1.

When it is desired to use the cover 20 as a security cover concealing and protecting items resting in the storage area on the floor 13 of the vehicle, handle 29 is removed from bracket 27 and extended across the vehicle to a similar bracket 37 on the opposite side wall 15 of the vehicle as shown in FIG. 3. In this position, the anchored edge or end 24 of the cover remains against housing 14 and handle 29 is extended over and held by bracket 37. The curved support 21, together with rod 25, spreads the opposite ends of the web 22 to remain in an extended covering position when extended across the storage area of the vehicle.

Figure 4:
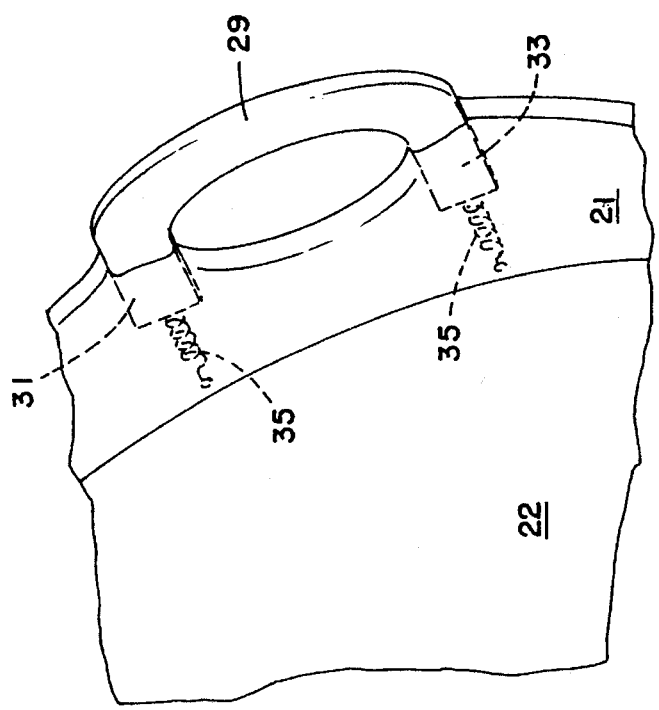
FIG. 4 is an enlarged fragmentary perspective view of the spring biased handle for the cover shown in FIGS. 1 and 3.

FIG. 4 shows the handle 29 mounted to support 21 by employing a pair of sliding posts 31 and 33 at the opposite ends of handle 29 which extend within the body of support 21 and which are held within the body of the support 21 by suitable stops and by tension springs 35 which tend to urge the handle to a collapsed position as shown in FIG. 1 but which places the web material 22 in tension when mounted as a security cover as shown in FIG. 3. Alternatively, brackets 26 and 28 could be spring loaded to provide tensioning for web 22.

Cover 20 can also be employed as a protective cover for the carpeted floor 13 of the vehicle as illustrated in FIG. 5 for placing objects such as a chainsaw 50 thereon which objects could otherwise damage or soil the carpeted floor 13. In the position shown in FIG. 5, the web material 22 rests on the floor with the curved support member 21 spreading out the web material to allow it to function as a carpet cover in such position. The anchored end 24 remains supported by brackets 26 and 28. In this position, the cover 20 provides a relatively large surface area for supporting items which are too heavy or bulky to be contained in the pouch configuration shown in FIG. 1.

Although the cover is shown mounted transversely with one end anchored as seen in FIGS. 1–5, it is possible to mount the cover of the present invention so that each of the ends can be removably anchored to both sides of the vehicle for greater flexibility, thus the system, although shown in its storage pouch defining configuration on the left side of vehicle could likewise be mounted on the opposite side of the vehicle and brackets 26 and 28 could be configured to removably secure the anchored end 24 such that the entire web 22 could be laid across the floor 13 of the vehicle.

Figure 6:
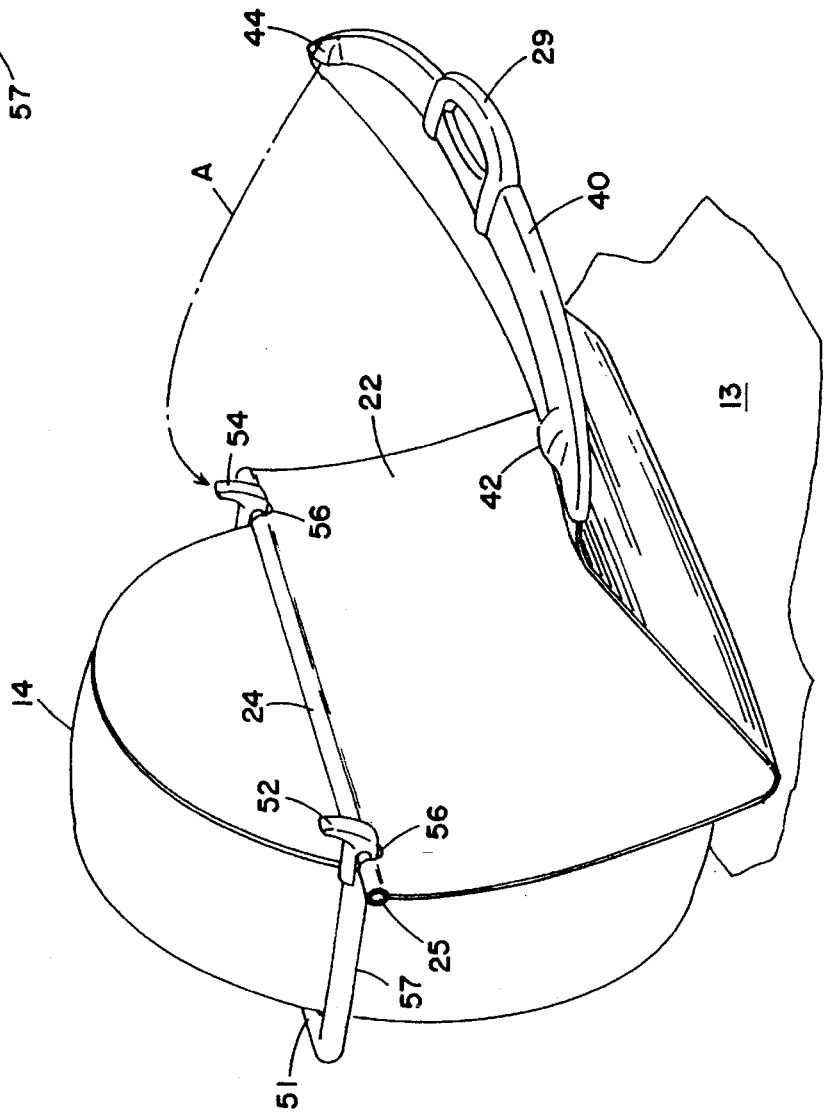
FIG. 6 is a perspective view of an alternative embodiment of the present invention.

In the alternative embodiment shown in FIG. 6 the identical structure to that of the earlier embodiment is numbered with the same reference numeral. The web 22 can be of the same general shape as that disclosed in the previous embodiment and is attached at end 24 to a reinforcing rod 25 as in the first embodiment. The opposite end includes a rigid support member 40 which may include a spring loaded handle 29 of the same construction as in the previous embodiment. Rigid support 40 however includes a pair of sockets 42 and 44 at opposite ends for engaging hooks 52 and 54 which are part of a bracket assembly 50 shown also in FIG. 7.

Bracket assembly 50 includes a U-shaped tubular frame 51 which can fit over and behind the spare tire housing 14 as shown in FIG. 6. A pair of hooks 52 and 54 each include a slot 55 which extend over the reinforcing rod 25 and over the cylindrical ends 53 of member 51 to define a rectangular support which fits over the top of spare tire housing 14 and is held thereto by virtue of the fact that the short legs 57 of the U-shaped member 51 are spaced apart a distance less than the diameter of the circular housing 14. The spacing will define the height of the end 24 of web 22 from the floor 13 of the vehicle and is selected to assure the same operation as that in the previous embodiment.

Figure 7:
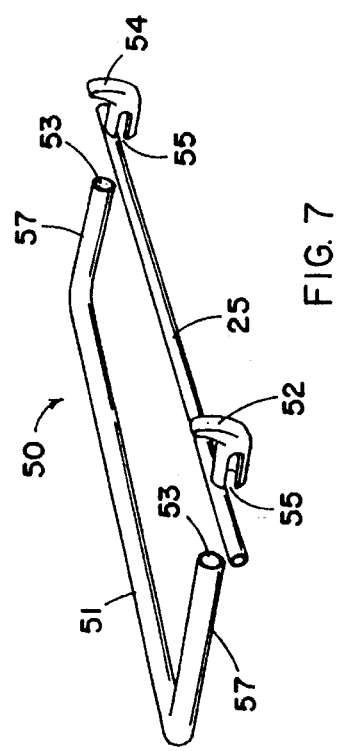
FIG. 7 is an exploded perspective view of a portion of the structure shown in FIG. 6.

With the embodiment shown in FIGS. 6 and 7, the web 22 also can be removed from the support bracket 50 by removing hooks 52 and 54 for such disassembly. It is noted that web 22 includes slots 56 therein to provide clearance for the slotted ends 55 of the hooks 52 and 54 as seen in FIG. 6. If desired, the bracket 50 can be made to telescope to adjust for different sized spare tire housings 14 or for the adjustment of the mounting of web 22 as desired. The support member 40 is hooked over bracket 50 by aligning sockets 42 and 44 over the hooks 52 and 54 as indicated by arrow A to position the cover in the same position as that illustrated in FIG. 1 in the embodiment. These and various other modifications to the preferred embodiment of the invention will become apparent to those skilled in the art but will fall within the spirit or scope of the invention as defined by the appended claims.

The embodiments of the invention in which an exclusive property or privilege is claimed are defined as follows:

1. A multi-function cover for a vehicle comprising:
    a web of flexible material including a rigid support at opposite ends thereof;
    a first bracket for holding one of said ends to a side of the vehicle; and
    a second bracket for releasably holding said opposite end of said web to the same side of the vehicle.

2. The cover as defined in claim 1 wherein said first bracket anchors said first end of said web to the vehicle.

3. The cover as defined in claim 2 wherein said support for said opposite end of said web includes a handle.

4. The cover as defined in claim 3 wherein said second bracket comprises a hook for removably receiving said handle.

5. The cover as defined in claim 4 wherein said handle is movably coupled to said support for said opposite end of said web and includes a spring to urge said handle toward said web.

6. The cover as defined in claim 5 wherein said web is made of a stain resistant material.

7. The cover as defined in claim 6 wherein said first bracket comprises a pair of spaced brackets adapted to be mounted to a side of the vehicle.

8. The cover as defined in claim 7 wherein said support at said one end of said web comprises a rod.

9. The cover as defined in claim 8 wherein said support at said opposite end of said web comprises a curved plate.

10. The cover as defined in claim 9 and further including the third bracket for mounting to an opposite side of the vehicle from said first bracket for removably receiving said handle to extend said web across the width of a vehicle.

11. A multi-function cover for a vehicle comprising:
    an elongated generally rectangular web of material which is adapted to have a first edge fixedly anchored to a side of a vehicle, said web having the width for extending across the width of the vehicle in spaced relationship to the floor of the vehicle and including a second edge having a handle for moving said second edge of said web between a first position immediately adjacent said first edge to define a storage pouch, a second position with said web extending downwardly and along a portion of the floor of the vehicle to define a partial floor cover for the vehicle, and a third position wherein said web extends generally horizontally between opposite sides of the vehicle in spaced relationship above the floor of the vehicle for providing a security cover.

12. The cover as defined in claim 11 and further including a first bracket for mounting said one edge of said web fixedly to the vehicle.

13. The cover as defined in claim 12 and further including a second bracket for removably mounting said second edge of said web to the vehicle adjacent said one edge of said web.

14. The cover as defined in claim 13 and further including a third bracket for removably mounting said second edge of said web to the vehicle in said third position.

15. The cover as defined in claim 11 wherein said web is made of an opaque stain resistant material.

16. The cover as defined in claim 11 wherein said first and second edges of said web include rigid supports.

17. The cover as defined in claim 16 wherein said handle is mounted to said support at said second edge of said web.

18. A multi-function cover for a vehicle comprising:

an elongated web of flexible material including a rigid support on at least one edge thereof;

a first bracket for holding an opposite edge of said web to the vehicle; and a second bracket for releasably holding said rigid support of said web to a position adjacent said first bracket such that said web defines a storage pouch.

19. The cover as defined in claim 18 wherein said support for said web includes a handle.

20. The cover as defined in claim 19 wherein said second bracket comprises a hook for removably receiving said handle.

21. The cover as defined in claim 20 wherein said handle is movably coupled to said support and includes a spring to urge said handle toward said web.

22. The cover as defined in claim 21 wherein said web is made of a stain resistant material.

23. The cover as defined in claim 22 wherein said first bracket comprises a pair of spaced brackets adapted to be mounted to a side of the vehicle.

24. The cover as defined in claim 23 wherein said support comprises a curved plate.

25. The cover as defined in claim 24 and further including a third bracket for mounting to an opposite side of the vehicle from said first bracket for removably receiving said handle to extend said web across the width of the vehicle.

26. A multi-function cover for a vehicle comprising:

a web of flexible material including a rigid support at opposite ends thereof; and a bracket for fixedly holding one of said ends to a side of the vehicle and releasably holding an opposite end of said web to the same side of the vehicle.

27. The cover as defined in claim 26 wherein said bracket includes a frame shaped to fit over a spare tire housing.

28. The cover as defined in claim 26 wherein said bracket includes a pair of spaced hooks for receiving said opposite end of said web.

29. The cover as defined in claim 28 wherein said opposite end of said web includes a rigid support with sockets aligned to extend over said spaced hooks for releasably holding said opposite end of said web to said bracket.

30. The cover as defined in claim 29 wherein said bracket includes a U-shaped member including ends for receiving said hooks.

31. The cover as defined in claim 30 wherein said hooks include slots for captively holding said one end of said web to said U-shaped member.

32. The cover as defined in claim 31 wherein said one end of said web is supported by a rod and said slots of said hooks circumscribe said rod and extend over said ends of said U-shaped member.

* * * * *